(12) United States Patent
Dragojlovic

(10) Patent No.: US 8,644,598 B2
(45) Date of Patent: Feb. 4, 2014

(54) COMPLEX PATTERN DECIPHERING USING ARCHITECTURE PARALLEL TO SWARM INTELLIGENCE

(76) Inventor: Neven Dragojlovic, Tangier (MA)

( * ) Notice: Subject to any disclaimer, the term of this patent is extended or adjusted under 35 U.S.C. 154(b) by 439 days.

(21) Appl. No.: 13/117,176

(22) Filed: May 27, 2011

(65) Prior Publication Data

US 2012/0301029 A1 Nov. 29, 2012

(51) Int. Cl.
*G06K 9/62* (2006.01)
(52) U.S. Cl.
USPC ........... 382/159; 382/181; 382/165; 382/293; 438/780; 438/514
(58) Field of Classification Search
USPC .......... 382/159, 181, 165, 203; 438/780, 514; 712/28, 35, 36
See application file for complete search history.

(56) References Cited

U.S. PATENT DOCUMENTS

| | | | |
|---|---|---|---|
| 6,729,542 B2 * | 5/2004 | Iwai et al. | 235/462.08 |
| 7,426,500 B2 | 9/2008 | Dragojlovic | |
| 2012/0315769 A1 * | 12/2012 | Sills | 438/780 |

* cited by examiner

*Primary Examiner* — Ruiping Li
(74) *Attorney, Agent, or Firm* — Louis Ventre, Jr.

(57) ABSTRACT

A method of pattern recognition is disclosed. The method includes steps of: providing a cellular computer structure with processing cell units arranged in layers; sensing the threshold parameter in an unknown pattern accessible; creating a binary number for each sensed threshold parameter; storing each binary number; creating a binary sequence; calculating a decimal number from each binary sequence; storing each decimal number in the central hexagram cell; outputting the binary sequence; preserving position information of each binary sequence; enabling the hidden layer to adjust the threshold parameter; and analyzing the binary numbers in the hidden layer to compare with known patterns to establish a recognized pattern.

7 Claims, 18 Drawing Sheets

COMPLEX PATTERN DECIPHERING USING ARCHITECTURE PARALLEL TO SWARM INTELLIGENCE

TECHNICAL FIELD

In the field of image recognition wherein the image analyzing system possesses a further capability of identifying discrete pattern's viewed within a scene or image; or of assigning pattern's to appropriate categories as determined by resident categorization rules.

BACKGROUND ART

The computer structure for implementation of the method of the present invention is described in U.S. Pat. No. 7,426,500, which is hereby incorporated by reference herein. The patent describes a cellular computer structure wherein each cell is a processing cell unit, consisting of a central hexagram surrounded by six receiving cells, each representing an invariable binary place fed into central hexagram's CPU controlled by a simple program. The cells are aggregated in a distributed honeycomb layer. A receiving cell is activated in the presence of a stimulus. The interconnected layers overlap so that the higher-level receiving cells get input from the lower-level central hexagrams and higher-level output modifies lower-level programs as well as sends input to other levels or Memory Units. Integration of layer output is achieved in a three-dimensional memory unit complex consisting of octahedrons, where each hexagonal side represents a binary number linked to 6 others through one binary place that makes adjacent numbers different. The software/hardware combination is modular in that it can be replicated and joined together. Capacity can thus be easily expanded by joining modules together in a LEGO-like fashion, where variations between modules would be found in simple programs and the input/output layers. The input into each memory unit comes from the output of a patch of central hexagrams, a clocked input, other modules output or a memory unit feedback.

The present invention is a method of using the computer structure that permits formation of complex systems capable of producing emergent behavior in networks similar to swarm intelligence and creation of meaning in complex patterns. The method is a unique and advanced method of a pattern creation and deciphering akin to a first step in creating general artificial intelligence.

SUMMARY OF INVENTION

A method of pattern recognition is disclosed. The method provides and employs a cellular computer structure that includes a plurality of processing cell units arranged in layers. Each processing cell unit comprises a central hexagram cell and six hexagram receiving cells. The central hexagram cell and each hexagram receiving cells include a central processing unit. The central hexagram cell is connected to the six hexagram receiving cells. The central processing unit in the central hexagram cell is also connected to an input/output port. The central hexagram cell and each hexagram receiving cell includes non-transitory memory. Each of the six hexagram receiving cells is connected to the central hexagram cell along one face of the central hexagram cell. Each hexagram receiving cell in the input layer includes a sensor capable of sensing a threshold parameter in an unknown pattern. Each processing cell unit is capable of localized calculations and is interconnected with at least one other processing cell unit. The layers of processing cell units include an input layer and a hidden layer.

The method further includes steps of sensing the threshold parameter in the unknown pattern accessible to each said sensor; creating a binary number for each sensed threshold parameter; storing each binary number created in each said hexagram receiving cell in the input layer; creating a binary sequence by assembling the binary numbers calculated in each hexagram receiving cell in each processing cell unit; calculating a decimal number from each binary sequence; storing each decimal number in the central hexagram cell of the processing cell unit from which the binary sequence is created; outputting the binary sequence to an adjoining processing cell unit in the hidden layer; preserving position information of each binary sequence outputted to said adjoining processing cell unit in the hidden layer; enabling the hidden layer to adjust the threshold parameter in the input layer to increase or decrease the number of processing cell units in the input layer that are activated for the unknown pattern; and analyzing the binary numbers in the hidden layer to compare with known patterns to establish a recognized pattern.

The method may include steps of: limiting the unknown pattern to one capable of being represented in two dimensions within the input layer; limiting the unknown pattern to one selected from the group consisting of: an image, a sound, and a data structure; providing a plurality of hidden layers to receive output from adjusted threshold parameters in the input layer; storing primitives in the first central processing unit; sending the primitives to the hidden layer; and providing a memory unit comprising eight interconnected hexagram cells forming an octahedron, each memory unit comprises eight octahedrons providing non-transitory storage capacity sufficient to hold 64 primitives.

BRIEF DESCRIPTION OF DRAWINGS

The drawings illustrate preferred embodiments of the method of the invention and the reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention. For example, the steps in the method of the invention may be performed in any order that results in complex pattern deciphering.

The method includes a step of providing a cellular computer structure comprising a plurality of processing cell units arranged in layers, the layers comprising at one input layer (510) and at least one hidden layer. The input layer (510) may also be referred to as an input/output layer because it accepts input and permits output. Herein, input layer is used for simplicity.

Figure 1:
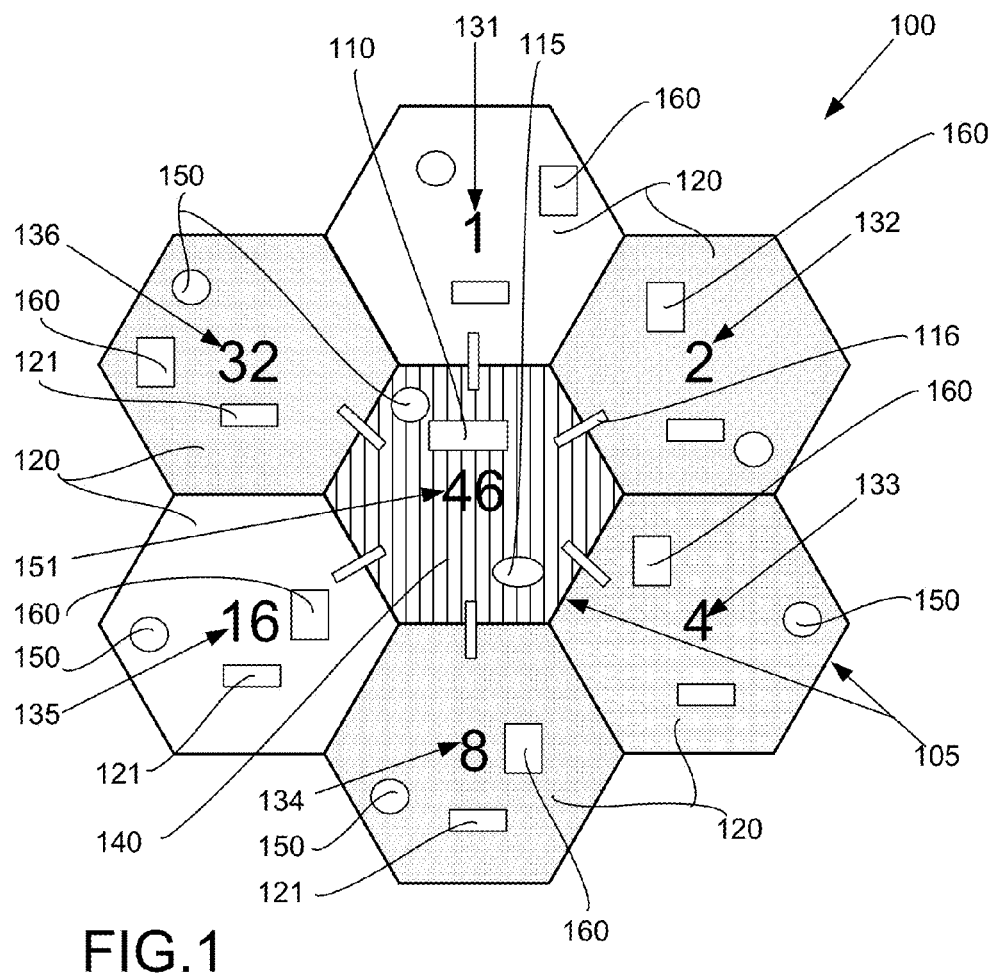
FIG. 1 is a plan view of a processing cell unit.

FIG. 1 shows a processing cell unit (100) comprising seven processing cells of having a hexagram structure (also referred to as hexagram cells) and comprising two types: a central hexagram cell (140) and a hexagram receiving cell (120). The processing cell unit (100) is a basic sensory and computational component used in a preferred embodiment of the method of the invention. Processing cell units are aggregated and arranged in layers to form the sensory and computational system used to decipher a pattern.

Figure 5:
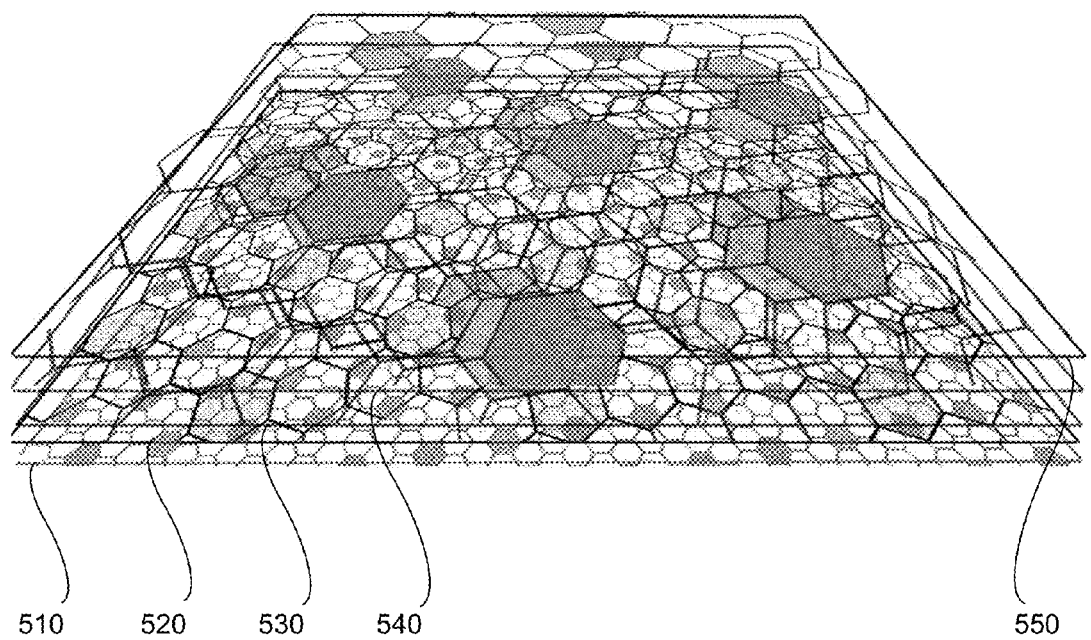
FIG. 5 illustrates an input layer and four hidden layers.

FIG. 1 shows the processing cell unit and FIG. 5 shows an embodiment with multiple layers, wherein a first hidden layer (520) overlays an input layer (510), and a second hidden layer (530), a third hidden layer (540) and a fourth hidden layer (550) are shown stacked atop the first hidden layer (520). Each processing cell unit (100) comprises a central hexagram cell (140) and six hexagram receiving cells (120), the central hexagram cell (140) and each hexagram receiving cell having six faces, represented by the face (105) shown in FIG. 1. While a single input layer is described, additional input layers are possible.

The central hexagram cell (140) comprises a central processing unit, designated first central processing unit (110). Each of the six hexagram receiving cells (120) also have a central processing unit, designated second central processing unit (121) to distinguish two different locations for central processing units.

The first central processing unit (110) and the second central processing unit (121) enable each of the seven hexagonal cells to perform localized calculations. Each second central processing unit (121) is preferably simpler than the first central processing unit (110). This is because the hexagram receiving cells (120) are preferably only in contact with the central hexagram cell (140) and the software needed by each of the hexagram receiving cells (120) accomplishes simpler tasks.

The central hexagram cell (140) is connected to the six hexagram receiving cells (120), the connection (116) shown in FIG. 1 enables communication between the six hexagram receiving cells (120) and the central hexagram cell (140).

The central hexagram cell (140) comprises an input/output port (115) that enables communication to and from other processing cell units, for example between layers.

The central hexagram cell (140) and each of the six hexagram receiving cells (120) comprises non-transitory memory (150) for storage of software and data. This memory is non-volatile computer memory and is a tangible media. The central hexagram cell (140) and each of the six hexagram receiving cells (120) may also include random access memory, preferably for the storage of threshold parameters and other data. All of the memory in the central hexagram cell (140), whether non-transitory or temporary is accessible by the first central processing unit (110). Similarly, all of the memory in each of the six hexagram receiving cells (120) is accessible by the second central processing unit (121).

Each of the six hexagram receiving cells (120) is connected to the central hexagram cell along one face (105) of the central hexagram cell (140).

Each of the six hexagram receiving cells (120) comprises a sensor (160), also referred to as a sensory unit, capable of sensing a threshold parameter in an unknown pattern. In the method of the invention, there is a step for sensing the threshold parameter in the unknown pattern accessible to each said sensor. An accessible pattern would typically be one adjacent to each of the hexagram receiving cells (120) in the input layer (510).

Figure 3:
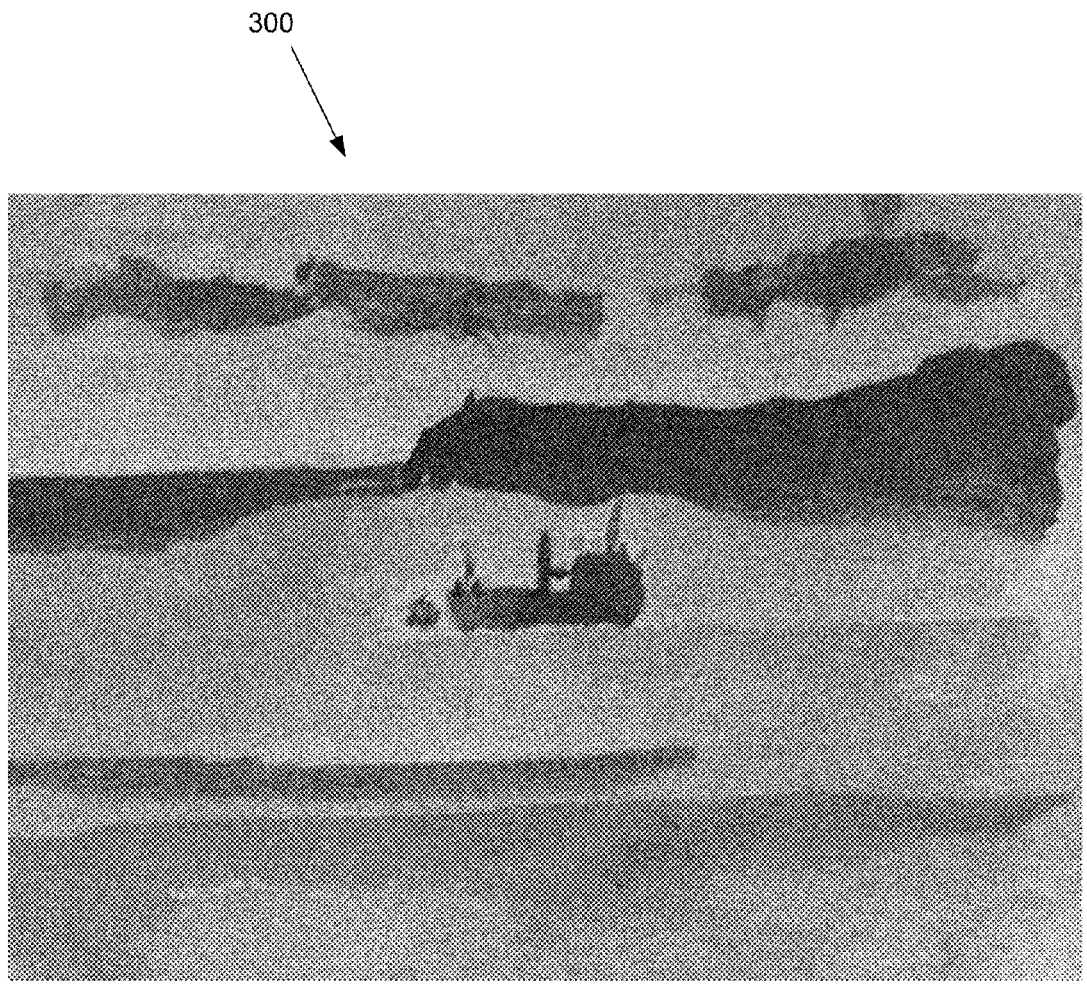
FIG. 3 illustrates an image that may undergo pattern recognition.

For some applications involving image recognition, the unknown pattern may be best addressed when it is rendered in two dimensions. FIG. 3 is an illustration of an image (300) that would be overlain by sensors (160) of the input layer. Thus, there is an optional step of limiting the unknown pattern to one capable of being represented in two dimensions within the input layer. The invention is not limited to image deciphering. It may be used to decipher any other pattern, such as a sound and a data structure.

Preferably, each sensor (160) of the input layer activates according to a given threshold. Preferably, the threshold parameter is the same in any one processing cell unit (100), and any processing cell unit (100) that is adjacent may have a different threshold parameter. The threshold parameter may be adjusted by the hidden layer to increase or decrease the sensitivity of the sensory unit. Other limiting characteristics on the threshold parameter, such as color tolerance, may also be configured for each of the hexagram receiving cells (120). Thus, in the method of the invention, there is a step of enabling the hidden layer to adjust the threshold parameter in the input layer to increase or decrease the number of processing cell units in the input layer that are activated for the unknown pattern.

As an example, one of the six hexagram receiving cells (120) may activate when a threshold parameter of 50% of a given color in an area adjacent to that cell is sensed. So, if 50 percent of the area is green and this is sensed by the adjacent cell, then that cell would activate and change its value from zero to 1 in storage in that cell.

Each of the six hexagram receiving cells (120) is designated with a binary position place number. FIG. 1 illustrates an example of the binary position place number: a first binary position place number (131) designated as "1"; a second binary position place number (132) designated as "2"; a third binary position place number (133) designated as "4"; a fourth binary position place number (134) designated as "8"; a fifth binary position place number (135) designated as "16"; and a sixth binary position place number (136) designated as "32."

The sensory units start out with a zero reading. When a sensory unit is activated by sensing a threshold parameter, a 1 is placed in that sensory unit. In FIG. 1, a sensed threshold parameter is indicated by the gray shaded sensory units at the second binary position place number (132), the third binary position place number (133); the fourth binary position place number (134); and the sixth binary position place number (136). In the method of the invention, there is a step for creating a binary number for each sensed threshold parameter. Each such binary number (that is, a zero or a 1) is stored in one of the activated hexagram receiving cells (120) in the manner described above. Thus, in the method of the invention there is a step of storing each binary number created in each said hexagram receiving cell in the input layer.

Figure 2:
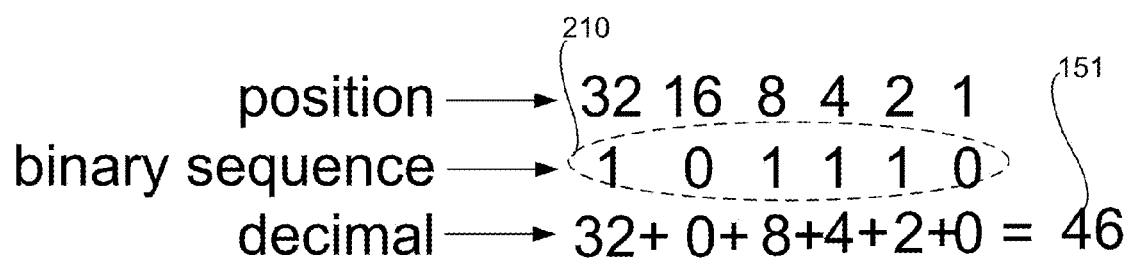
FIG. 2 illustrates a calculation of the decimal number for a sensed threshold parameter.

Listing the activation sequence in order from left to right order, from the highest binary position place number to the lowest, yields a binary sequence (210) equaling, in this example, 101110, which equates to a decimal number (151) equal to "46." FIG. 2 illustrates the binary position place number, its binary number (a zero or a 1) and the decimal number resulting from the 101110 binary sequence. The method of the invention includes a step of outputting the binary sequence to an adjoining processing cell unit in the hidden layer.

The decimal number (151) is calculated in the usual way for binary numbers. Thus, the method of the invention includes a step of calculating the decimal number (151) for the sensed threshold parameter that activated the hexagram receiving cells (120).

FIG. 2 illustrates an example of the calculation. At the sixth binary position place number (136) designated as "32," is 1 and therefore it equates to 2 to the fifth power or 32, which is added the decimal number from the fifth binary position place number (135). Since the fifth binary position place number (135) designated as "16" is zero, it therefore equates to a decimal value of zero. The fourth binary position place number (134) designated as "8," is 1 and therefore it equates to 2 to the third power or 8, which is added to the previous decimal number. The third binary position place number (133) designated as "4" is 1 and therefore it equates to 2 to the second power or 4, which is added to the previous decimal number. The second binary position place number (132) designated as "2" is 1 and therefore it equates to 2 to the first power or 2, which is added to the previous decimal number. The first binary position place number (131) designated as "1" is zero and therefore it equates to a decimal value of zero.

The decimal values add to 46, which becomes the entry for the value stored in the central hexagram cell. The decimal value is a means to preserve position information of each binary sequence (210). Thus, the method of the invention includes a step of preserving position information of each binary sequence outputted to an adjoining processing cell unit in the hidden layer.

Figure 7:
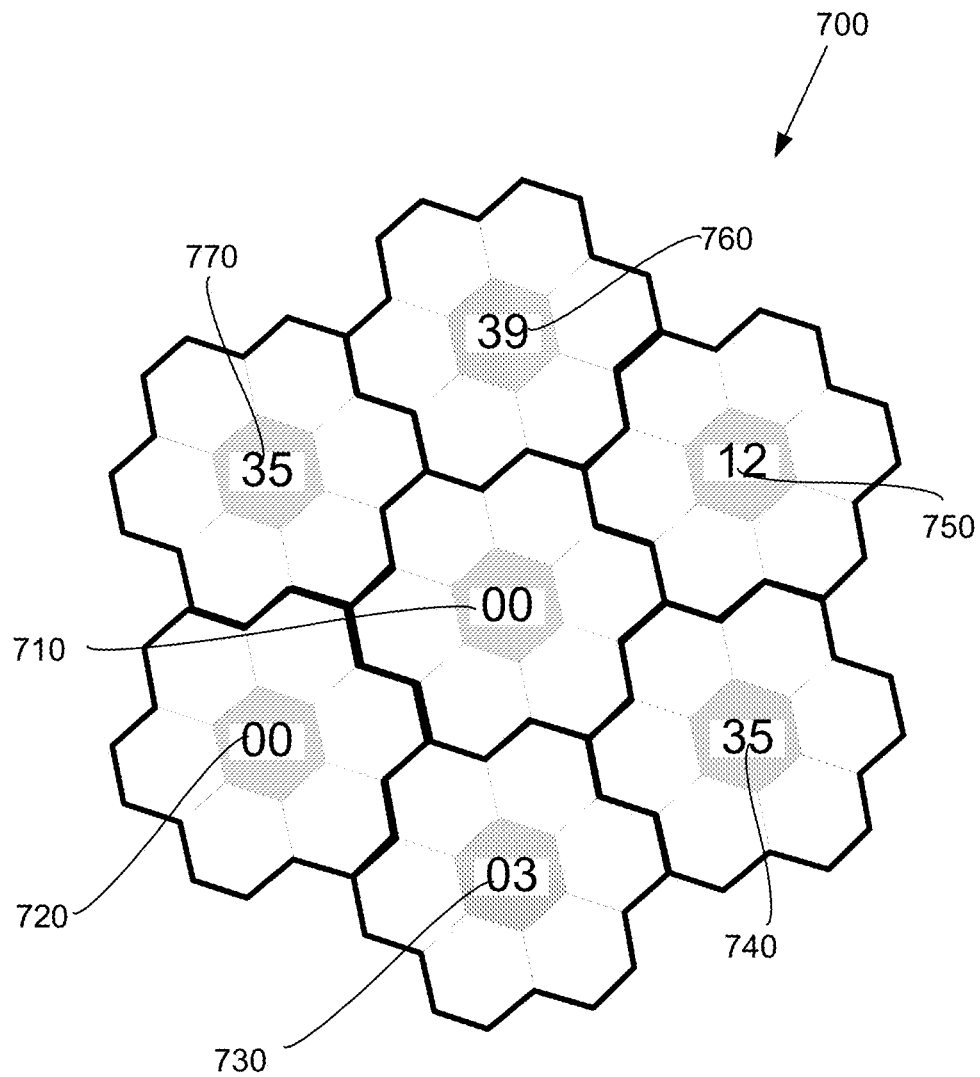
FIG. 7 illustrates a patch.

Each processing cell unit (100) is interconnected with at least one other processing cell unit, preferably six other processing cell units, the seven interconnected processing cell units form a patch (700), which would be in the input layer (510). This is illustrated in FIG. 7 where a patch (700) is shown and in FIG. 4 where seven patches are connected together and each patch is outlined with a heavy line to make it easier to distinguish each patch in the figure.

Figure 4:
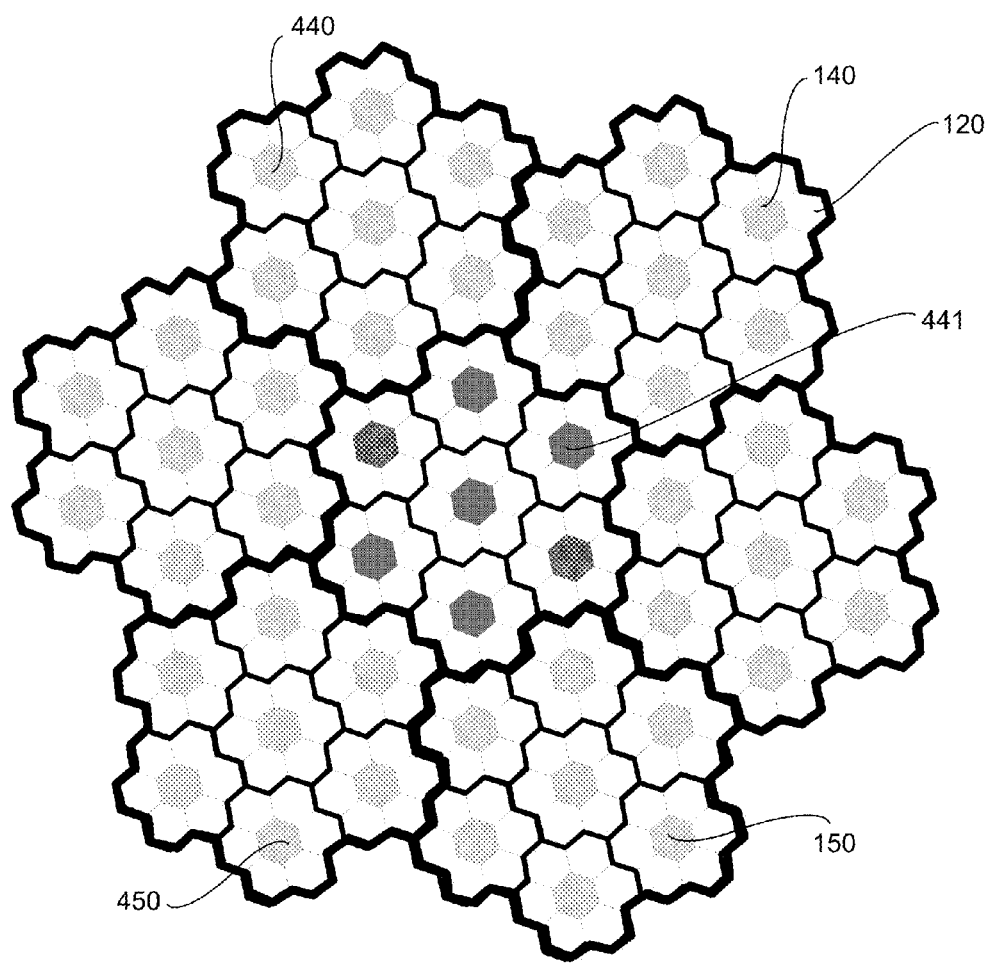
FIG. 4 illustrates connection of seven patches.

In FIG. 4, three different threshold parameters are used and this is indicated by the use of three different line fills in the central hexagram, namely, central hexagram cell (140); second central hexagram cell (440); and third central hexagram cell (441). These patches, for example, might be sensors for red, blue and green useful to detect the colors on an image to be deciphered. In FIG. 4, each patch is comprised of 7 processing cell units with the same central hexagram cell. Each patch may comprise 7 processing cell units with different central hexagram cells.

Because a patch comprises 7 processing cell units, there are seven decimal numbers, each stored in one of the seven central hexagram cells. Each of these seven decimal numbers is also known as the patch number. The order of the seven decimal numbers from left to right has the central processing cell unit binary number first, then from the highest binary position place number to the lowest. This is represented by the order c/32/16/8/4/2/1, where c stands for the central processing cell unit decimal number. This order is shown in FIG. 7 where c (710) is shown at the center of the patch (700); the 32 position (720) is in about a 7 o'clock position; the 16 (730) is in about a 6 o'clock position; the 8 position (740) is in about a 5 o'clock position; the 4 position (750) is in about a 2 o'clock position; the 2 position (760) is in about a 12 o'clock position; and the 1 position (770) is in about a 10 o'clock position. In FIG. 7, the patch number would therefore be ordered: 00000335123935.

Overlap of the hidden layer over the input layer permits the hidden layer to receive the binary sequence and decimal number from each first central processing unit (110) of Input layer (510). The sensitivity of sensory units in input layer is then controlled by hidden layer in order to adjust to local lighting conditions (e.g., lower threshold in the "shade," and greater threshold in "highlight" areas). Such adjustment can increase edge contrast and help with shape recognition.

In this description, only one hidden layer is used, but other hidden layers can also be used. For example, each color (or type of information) can be calculated separately by a color layer. In FIG. 5, four color layers are shown. Any of these may be a layer with a combination of colors. The threshold number of active sensory units in a hidden layer may be set at 3, but can be modified. Positions of central hexagram processing unit outputs to a hidden layer are preserved in the input number to memory units. The input of one patch goes to a memory unit (600).

An example of feedback adjustment of a threshold parameter from hidden layer to input layer follows. The central processing unit of each of the hexagram receiving cells (120) in the hidden layer, i.e. the second central processing unit (121), would calculate how many active input layer sensory units were activated, add them together and divide by 7. If the resulting number is greater than the threshold used by input layer, then the second central processing unit (121) would send the resulting number, i.e. the adjusted threshold parameter, to the input layer's central hexagram processing unit, i.e., the first central processing unit in the input layer, from which the activated data was received. Then the input layer's central hexagram processing unit would readjust the threshold parameter in the receiving cells surrounding it. For example, the threshold parameter at input layer was 50% or ½. In a patch with 49 cells, 28 input layer sensory units were activated, therefore 28/49=57%, which would be the new threshold parameter. In order to reach the number of activated sensory units, each central hexagram processing unit in the hidden layer would count binary 1s in the numbers forwarded to its sensory units. For example 39=100111. There are four 1s in this binary sequence, which means that 4 sensory units in input layer had been activated. Similar means of adjustment of thresholds can be used throughout the module.

The non-transitory memory (150) of each processing cell unit (100) adds to a memory complex where primitives are stored to aid in analyzing the binary numbers. Thus, in the method of the invention, there is a step for analyzing the binary numbers in the hidden layer to compare with known patterns to establish a recognized pattern. Other optional steps in the method are storing primitives in the first central processing unit; and sending the primitives to the hidden layer.

The organization of the hexagonal cells described above is the simplest assembly while capturing the essence of the invention. However, more complex assemblies involving assemblies of patches, honeycomb structures of assembled processing cell units, octahedrons, nodes, and dedicated cells for memory, are possible and consistent with the intended scope of the invention. These complexities are now discussed.

Figure 6:
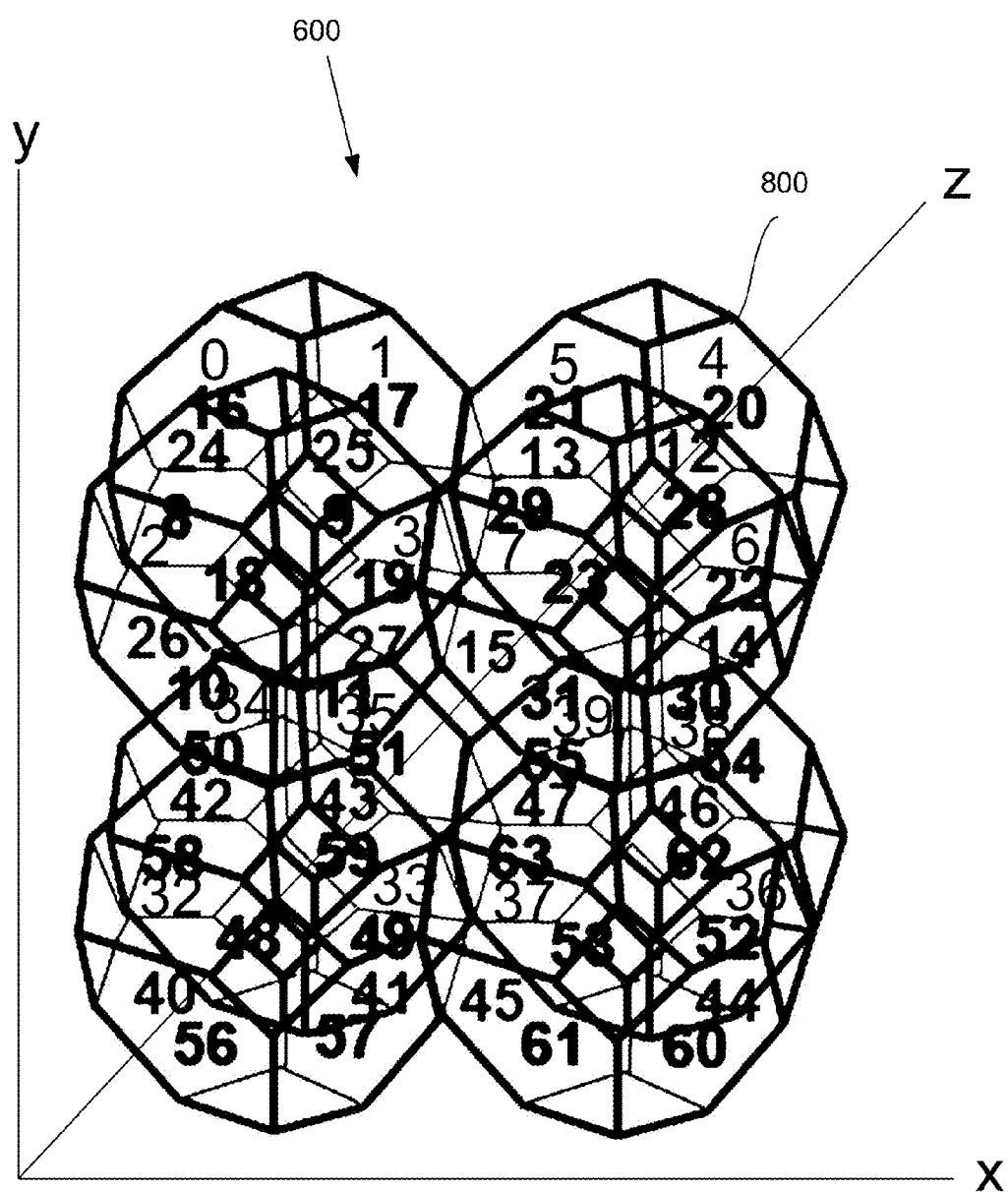
FIG. 6 illustrates a memory unit.

Patches send the decimal number to memory even when only one processing cell unit (100) of the seven processing cell units in a patch (700) is activated. Each patch (700) in the input layer is oriented towards a patch (700) in the hidden layer. For more than one hidden layer, the orientation is toward a patch in each hidden layer. Each patch in a hidden layer comprises a memory unit (600) in a three dimensional position from the input layer. Such three dimensional memory comprises a memory complex that can extend as much as necessary to cover the whole input field. Patches can be assembled in three dimensions using multiple truncated octahedrons as shown in FIG. 6. The memory unit shown in FIG. 6 is only for one patch of the hidden layer, but that memory unit can stack in three dimensions, representing the patches in a two-dimensional input layer. Patches in the input layer typically have three dimensions, so they would correspond to assembled memory units. For example, in FIG. 4, patches in positions 16 and 2 would represent one axis, e.g. the z-axis; 32 and 4, the x-axis; and 1 and 8, the y-axis.

Figure 8A:
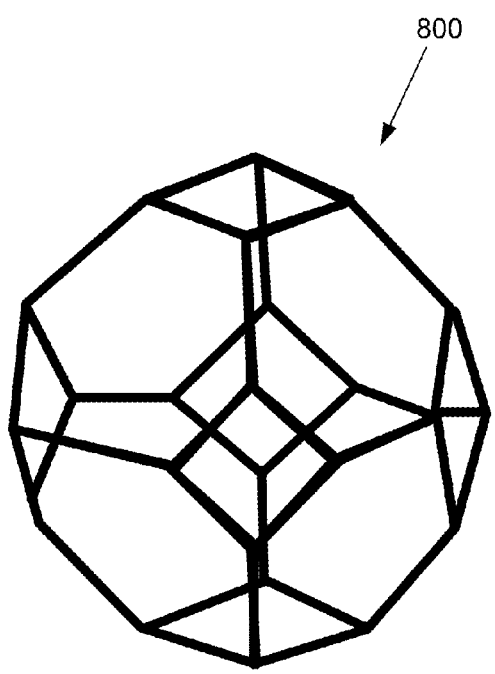
FIG. 8A illustrates a transparent octahedron.
Figure 8B:
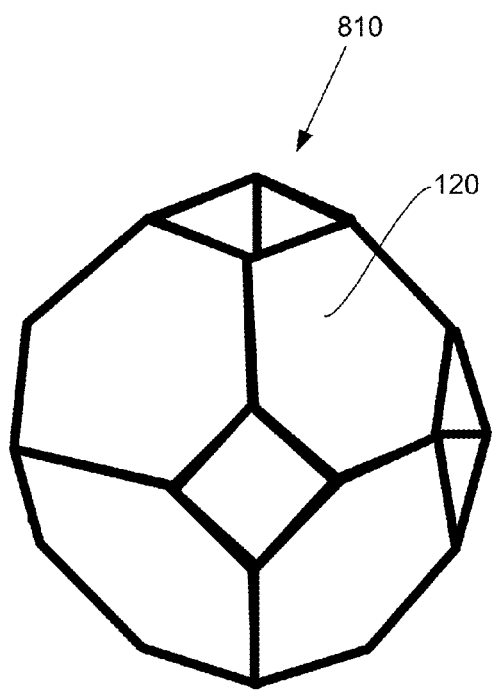
FIG. 8B illustrates an opaque octahedron.

FIG. 8A and FIG. 8B show a preferred embodiment of a truncated octahedron (800), which may be referred to herein for discussion purposes as simply an octahedron. These are 8 processing cell units connected together to form a truncated octahedron (800). FIG. 8 will be considered to describe an octahedron comprising 8 processing cell units. FIG. 6 shows 8 interconnected truncated octahedrons with a storage capacity that will at a minimum hold 64 primitives in a memory unit (600), each primitive represented by a dedicated cell. The composition of a memory unit (600) comprises decimal numbers from 0 to 63. Each central hexagram cell (140) is constrained to connect to another central hexagram cell at a face (105) that differs in only one binary position. Ends of the memory unit attach to next memory unit, each corresponding to a hidden layer patch. Thus, a memory complex may cover the whole input field.

FIG. 8A and FIG. 8B show the same truncated octahedron (800). FIG. 8A illustrates it as a transparent octahedron for better visualization of each processing cell unit (100) and FIG. 8B illustrates the same shape as an opaque octahedron (810). In the opaque octahedron (810) each processing cell unit (100) is connected such that there are four processing cell units forming the upper half of the opaque octahedron (810) and four similarly joined processing cell units forming a lower half. Additional octahedrons would join along the unoccupied faces of each processing cell unit (100) to complete connections with each decimal number.

FIG. 6 displays 8 transparent octahedrons where the central hexagram cells (dedicated cells) have decimal numbers. Assuming partial activation of the hexagram receiving cells (120) such that the numbers in seven central hexagram cells are ordered as describe above according to c/32/16/8/4/2/1, then it forms the a central patch decimal number 00/00/03/35/12/39/35 and the following observations can be made:

Joining of X-axis Memory Unit units: each patch corresponds to one three dimensional location in 2D (two dimensions) as well as in 3D (three dimensions). This enables a flat input layer can be translated to a 3D structure.

Using the 2D coordinate system with 3 axes in a honeycomb structure also permits hexagonal image processing addressing system.

Joining of Y-axis memory unit: the vertical edge numbers of central memory unit connect to edge numbers in these stacked up memory units with a perfect fit and extend the ends of memory unit with corresponding numbers, i.e. 29 (011101 in binary) to 61 (111101 only one binary place difference).

Joining of the whole activated complex: this limited number of patches creates a very complex activated memory complex that becomes hard to visualize directly, but its apparent complexity represents the input field in a manner that permits further analysis and solves a problem of connecting disparate patterns together into a unified field with new attributes.

Each central hexagram cell (140) has a bottom and a top side. For example, if a central hexagram cell (140) were pictured as a coin, one would call the top side heads and the bottom side tails. An inside node can be considered as octahedrons formed from the central hexagram cell types with heads facing it, and an outside node as an octahedron formed from the central hexagram cell types with a tails side facing it.

When there are multiple octahedrons, a honeycomb structure is formed. Octahedrons in a honeycomb structure may also be visualized and referred to as nodes, where some can be considered to be inside nodes and others can be considered outside nodes. The nodes enable creation of networks unifying the whole input layer or field, and enable input from, or output to, adjoining modules through creation of another two dimensional input field.

Figure 19:
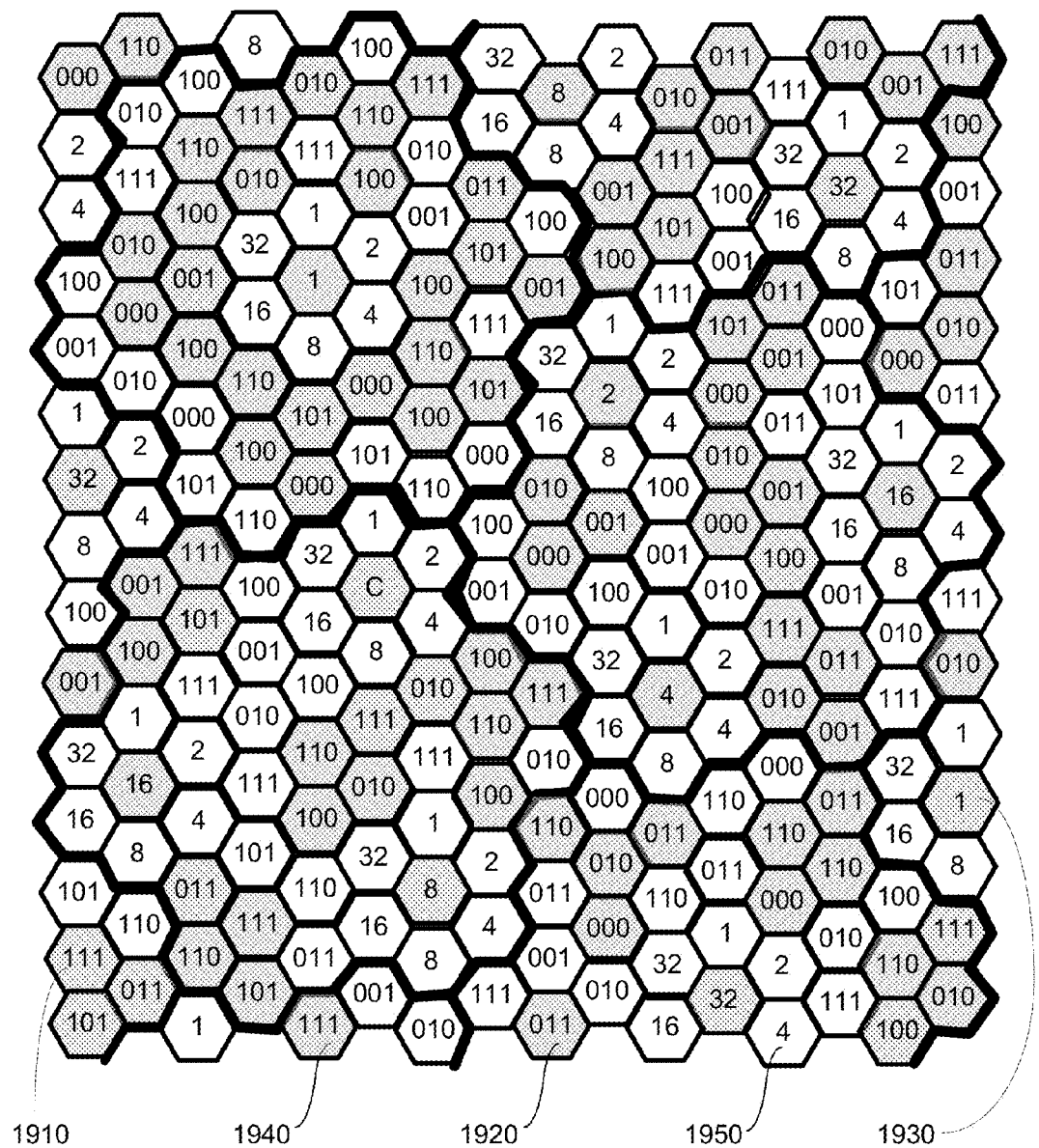
FIG. 19 illustrates module output of inside nodes to a node input/output layer.

FIG. 19 is a segment illustrating multiple octahedrons forming honeycomb structure. Central hexagrams with dotted fill (1910) represent inside nodes. Central hexagrams with slanted line fill (1920) represent output nodes. Central hexagrams with vertical line fill (1930) represent activated dedicated cells in the memory unit. Hexagrams with horizontal line fill (1940) surrounding inside nodes are connections to inside nodes in adjacent memory units and hexagrams with horizontal line fill (1940) surrounding outside nodes are connections to outside nodes in adjacent memory units. Hexagrams with no fill (1950) surrounding inside nodes indicate hexagram connections to the inside nodes within the memory unit, and hexagrams with no fill (1950) surrounding outside nodes indicate hexagram connections to the outside nodes within the memory unit. Darker outlines indicate input patches for next module, or feedback patches to the original module. Numbers within surrounding hexagrams indicate the positions in three dimensions of connecting octagons. Numbers in central hexagrams (also referred to as dedicated cells) indicate the binary position for decimal numbers.

An inside node is an octahedron structure interconnected to 8 dedicated cells and six other inside nodes as well as to the input layer (510), which may also be referred to as a node input/output layer. Similarly, an outside node is an octahedron structure interconnected to 8 dedicated cells and six outside nodes as well as to the input/output layer. The position (P) of each binary place of an inside node and the corresponding dedicated cells can be defined as a binary number, Px, and for the surrounding nodes as Py. Py has 64 possibilities. If node 1, 4 and 32 were active, the Py for the central node would be 100101=37. Corresponding numbers of an outside node would be defined as Rx and Ry. Thus, an embodiment of the invention may include a step of creating a network of octahedrons in a honeycomb structure, said honeycomb structure unifying the input layer and said octahedrons serving as nodes for output for adjoining modules.

Embodiments of the invention may employ cells dedicated to memory storage, that is, dedicated cells, wherein each such cell stores the given number in a predetermined memory spot. Dedicated cells include a hexagonal data cell dedicated to one of 64 primitives. Primitives are processing cell patterns.

The memory may be short-term non-transitory memory or long-term non-transitory memory, which is referred to herein as memory. Short or long is only used to distinguish how long something is held, not to distinguish a different kind of memory. Thus, this categorization of memory is only to distinguish what is held in such memory is held for a short term or a longer term. Short-term memory is preferably provided in registers, and special areas in central hexagram cells of the hidden layer as well as in dedicated cells. Thus, there is an optional step of providing short-term non-transitional memory in each central hexagram of the hidden layer.

Long-term memory is preferably found in central hexagram cells of the input layer, receiving hexagram cells of the hidden layer, central hexagrams of the hidden layer, dedicated cells of a memory unit, and in inside and outside nodes, which are discussed herein, infra.

Memory in each dedicated cell is preferably organized in an array of 256 on y-axis (Rx), which represents all possible binary numbers for the 8 active dedicated cells for the outside node, and 256 on x-axis (Px), which represents all possible binary numbers of the 8 active dedicated cells for the inside node.

For example, central active patch number 00000335123935 would be sent to dedicated cell 35 and then converted to a binary number where 00|00|03|35|12|39|35 is converted to 0011111, which is equivalent to 31, which would represent the active patch number. Each two digits represent the decimal numbers from a given processing cell in a specific position, and if the number is greater than 0 it is converted to 1, else it stays as a 0.

Each dedicated cell would also have its memory organized in an array of 256 on y-axis representing an active patch number, and 256 on x-axis representing positions at which the decimal number is found. In this example, 35 is found in position 1 and 8, the number would be 0001001=9. Memory in a dedicated cell may be organized in an array of 256 on y-axis representing an active patch number, and 256 on x-axis representing Px. That would permit relating Rx, with Px, with the active patch number and the dedicated cell number. The dedicated cell number represents the position at which the decimal number is found.

For example, these two numbers (active patch number and dedicated cell number) in dedicated cell 35 would set the short-term memory. The memory block contains all possible combinations of active processing cells, but does not specify in what combination of other numbers it was found, therefore can be recalled in all the other variations of 31. The only fixed information is 9, where the pattern 35 was situated in this example. The active patch number 31 is also sent to processing cell units 39, 12 and 3. Each of these processing cell units would store 31. For recall of each one of these numbers, it is enough if the same memory location gets triggered for 31.

Long and Short-Term Memory in Processing Cell Units

For short-term memory, the record would last for only certain number of clock cycles (according to software needs for feedback to arrive). If no feedback arrives, the short-term memory would erase.

For long-term memory to be set, the feedback from nodes has to arrive, one position for outside node and another for inside node where each one of those numbers would indicate which other processing cell units were active at the same time. If the feedback does arrive, the three sets of numbers would be stored (active patch number/dedicated cell number pair, active patch number/Px pair, and Rx/Px pair).

Each memory location would have possibility to store strength of that memory anywhere from 0 to 7 (three binary positions). Simple programs in each node can also send back negative feedback (−1 for strength).

The Rx/Px long-term memory is organized in an array of 256 on y-axis representing Rx (active dedicated cells for that outside node), and 256 on x-axis representing Px (active dedicated cells for that inside node). The active patch number and Px would be linked in another 256/256 array (active patch number for y-axis and Px for x-axis). This way the same network established by the inside node associated with that Px, and the active sites in the hidden layer patch (active patch number) stay linked. For example the active patch number 31 and Px 64 are linked, which means that whenever the inside node is 64, it will "remember" active patch number 31, associated with whichever dedicated cell number, therefore permitting variation if several dedicated cell numbers were memorized with active patch number 31.

The memory unit preferably transforms any pattern into 64 primitives (dedicated cells). Thus, there is an optional step in the method of the invention of providing a memory unit structure comprising eight interconnected hexagram cells forming an octahedron, each hexagram unit comprising non-transitory storage capacity sufficient to hold three arrays of 256/256 memory locations.

Also, the difference between adjacent primitives is of only one binary place, thus grouping together similar primitives, which are then further gathered by inner and outer octagons. A clock cycle may be introduced for purposes of synchronization, that is, a primitive may be triggered by a previous image, but would not be memorized or analyzed on the next pulse because it did not arrive at the same time as the next pattern primitives.

Another aspect derives from the formation of the octagon networks, which unify the structure of the whole pattern field (input field). While the input pattern may only be in disconnected local units. Octahedron networks can be used as the underlying structure of given input, therefore comparable to other different inputs that may yield the same (or similar) network. The output from the octahedrons can be transformed again into a two dimensional (2D) pattern input for the next module, which would function in the same way as the first module, but may have different software attached to its hexagram cells. This can be done any number of times, therefore permitting expansion and creation of a complex system of modules and their inter-connections. In other words, brain system simulation.

Feedback from Dedicated Cells of the Memory Unit to its Related Patch

When dedicated cells of the memory unit receive feedback from inside node/outside node networks, it would send the associated decimal number to the patch, activating the binary position processing cells. For example, cell 35 would send its decimal number 9 (0001001) to the patch and activate the processing cells at binary positions 8 and 1. Any other combination of processing cell outputs that equals the original active patch number (31=0011111) where dedicated cell 35 has decimal number 9 would activate processing cells in the same way. Any other active patch number, whose decimal number for dedicated cell 35 was 9, would also activate the patch in the same manner. Each processing cell would memorize the feedback in an array where y-axis would represent decimal numbers (0 to 64), and x-axis would represent decimal active patch numbers (0 to 256). That would specify active processing cells and associated dedicated cells, but would not provide the actual position of each dedicated cell. Therefore, each processing cell would also memorize in an array where y-axis would represent decimal numbers (0 to 64), and x-axis would represent the decimal number's position (0 to 256).

Inner and Outer Nodes

Each node gathers all the processing cell units facing its 8 faces. Each dedicated cell connects to one inner node (inside node) and one outer node (outside node)

Complete Memory Unit Architecture

Each inside node and each outside node preferably have different dedicated cell units associated with it. In each memory unit there are 8 inside nodes, and 27 outside nodes connected to it, with only one outside node fully specified by that memory unit. The rest of outside nodes are also partially specified by surrounding memory units, thus linking the totality of input.

Node Architecture

Figure 9:
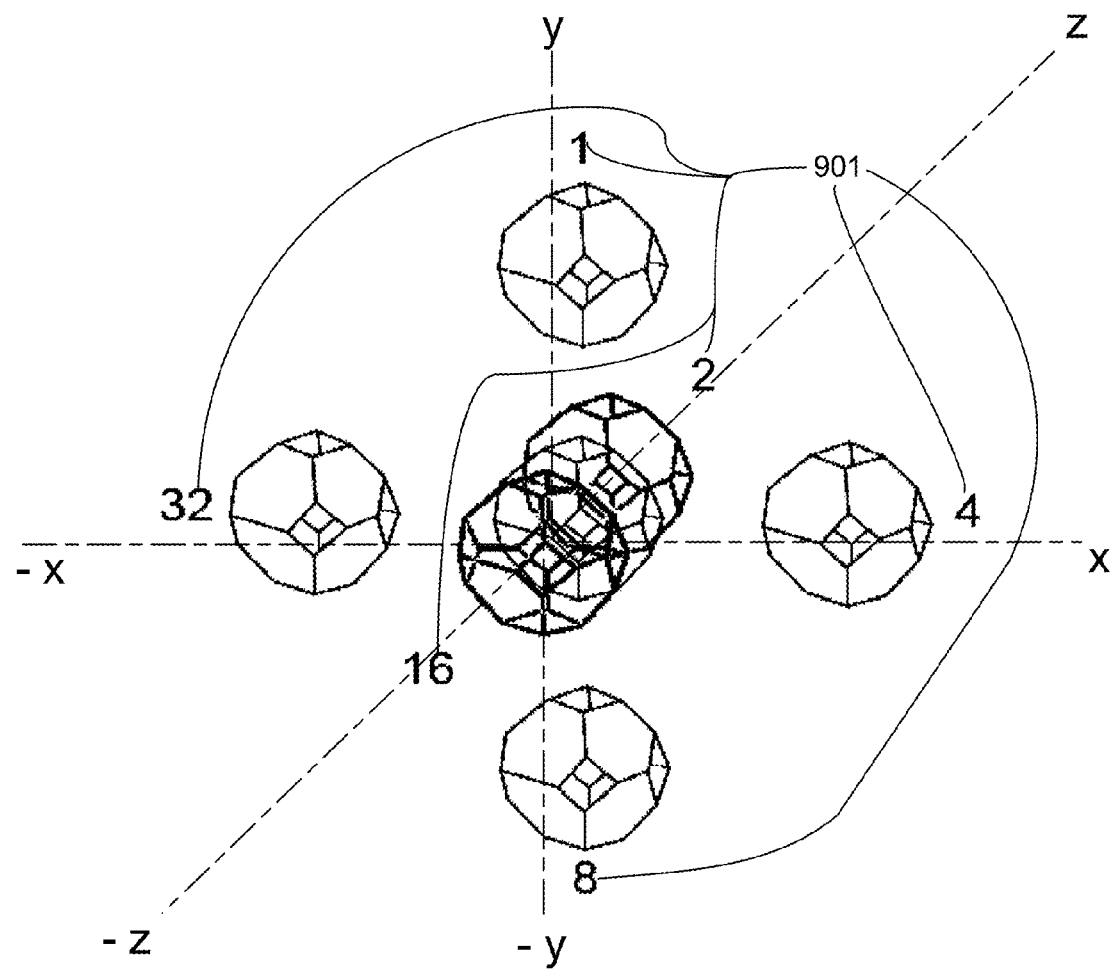
FIG. 9 shows a binary position for each node that equates to a Py number.

FIG. 9 shows a binary position for each node that equates to a Py number. Each node connects to 6 surrounding nodes with a handshake type connection, so that if both are active it inscribes 1 in the binary position (901) that is appropriate, thus creating a Py number. The 3D position of each of the 6 surrounding nodes is linked to a specific binary place and the corresponding nodes are shown in FIG. 9. The binary position (901) is the position of each binary place and the corresponding nodes. For example, the binary position 1 represents the node at a positive y-axis position, the binary number 2 represents the node at positive z-axis position, the binary number 4 represents the node at positive x-axis position, the binary number 8 represents the node at negative y-axis position, the binary number 16 represents the node at negative z-axis position, and the binary number 32 represents the node at negative x-axis position. Py has 64 possibilities. If node 1, 4 and 32 were active, the Py for the central node would be 100101=37.

Figure 10:
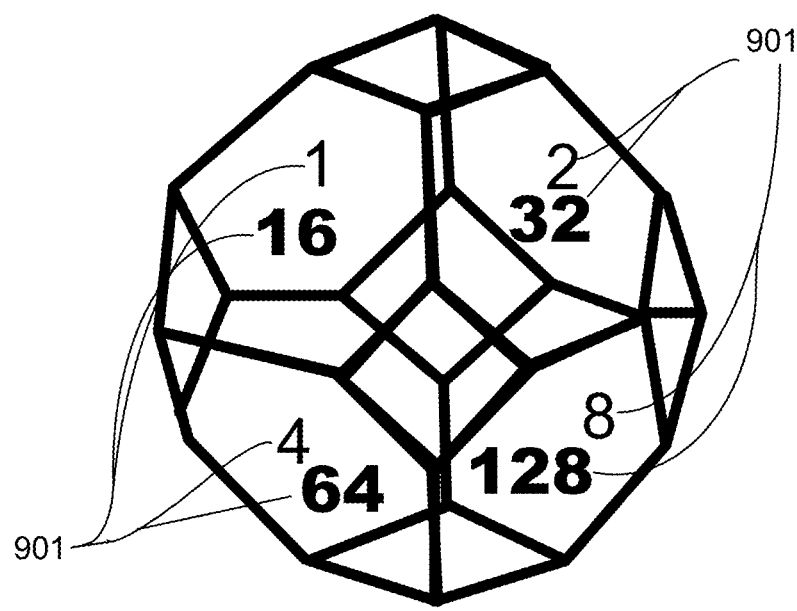
FIG. 10 shows a binary position for each dedicated cell that equates to a Px number.

FIG. 10 shows a binary position (901) for each node that equates to a Px number. Each face of the octagon connects with the corresponding dedicated cell so that if dedicated cell is active the corresponding binary place in Px is changed to 1. Px has 256 different possibilities. This Px number is sent back to dedicated cell units. The same system is used for inside nodes and outside nodes.

Figure 11:
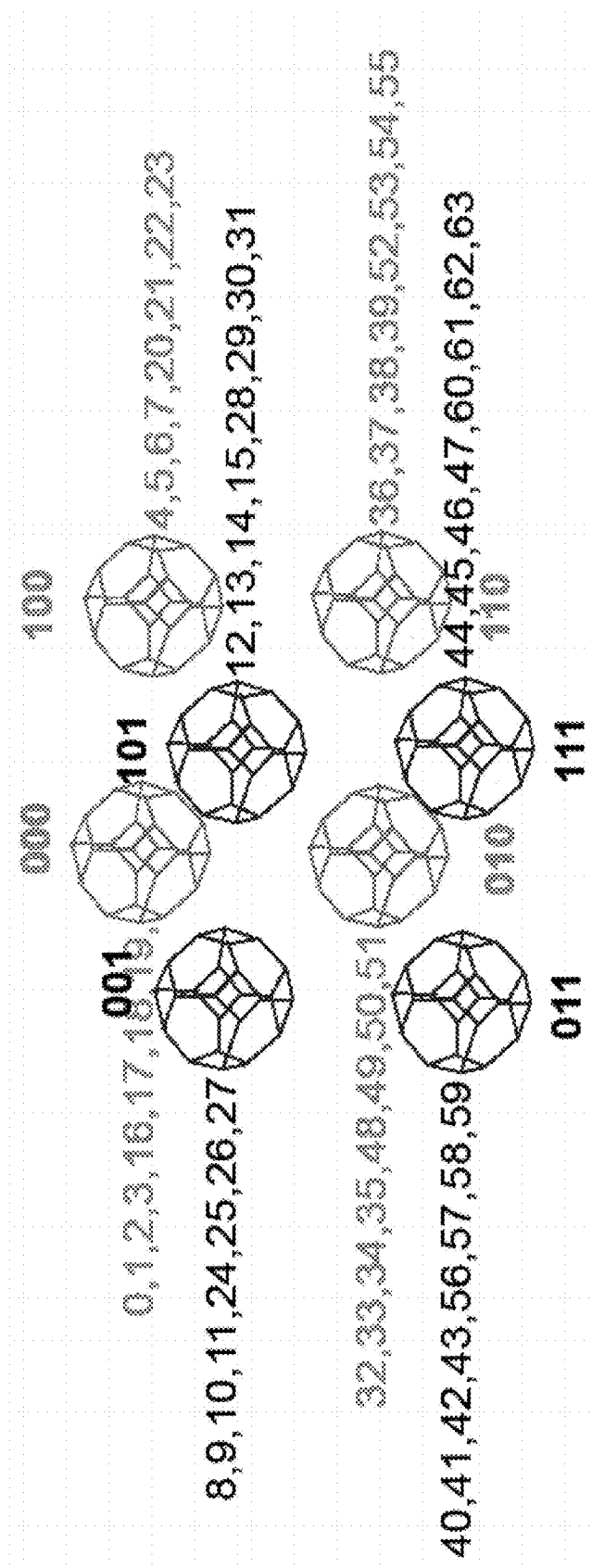
FIG. 11 illustrates inside nodes.

FIG. 11 illustrates inside nodes. There are 8 inside nodes in a given memory unit, each node has its associated binary number identifier, which also determines which processing cell units it is associated with (here dedicated cell numbers are ordered in the node's binary position number, starting with 1 and ending with 128). As example, node 101 is associated with 12, 13, 14, 15, 28, 29, 30, and 31. If numbers 12, 15 and 29 were active, Px for node 101 would be 00101001=41.

Figure 12:
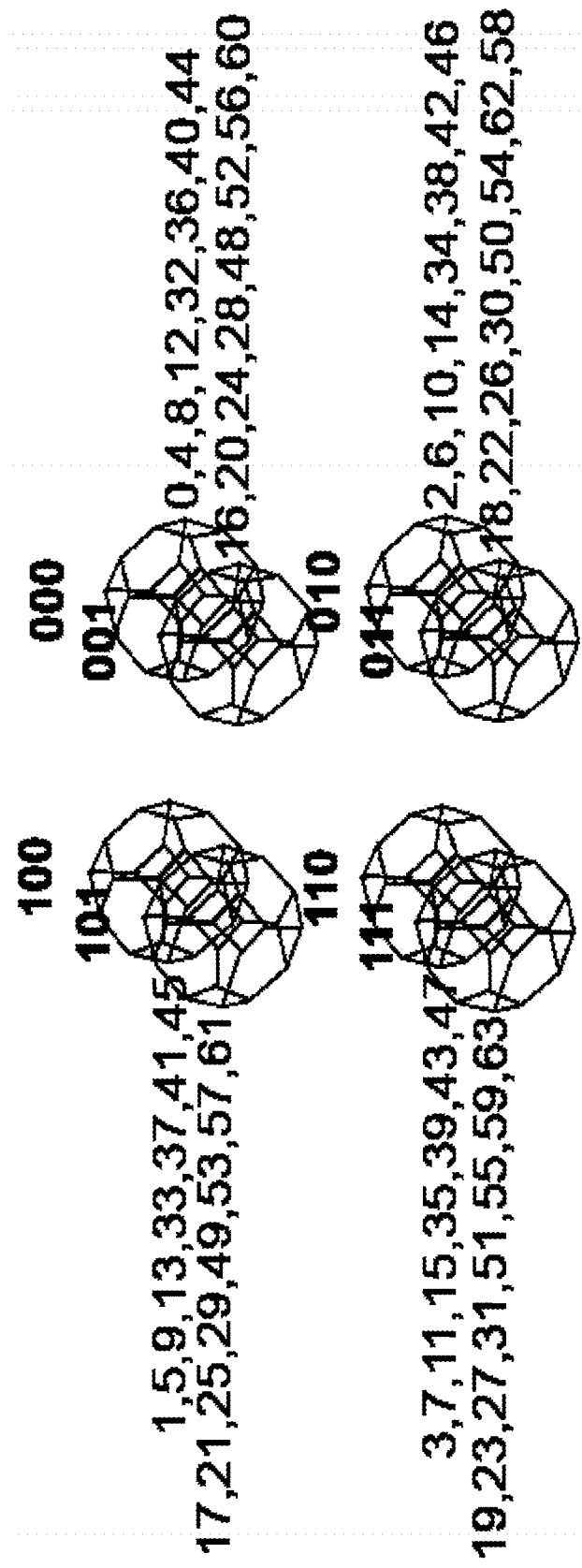
FIG. 12 illustrates outside nodes.

FIG. 12 illustrates outside nodes. Outside nodes also have 8 types, and the processing cell units associated with them are different from inside nodes. For example, node 101 is associated with 17, 21, 25, 29, 49, 53, 57, and 61.

Figure 13:
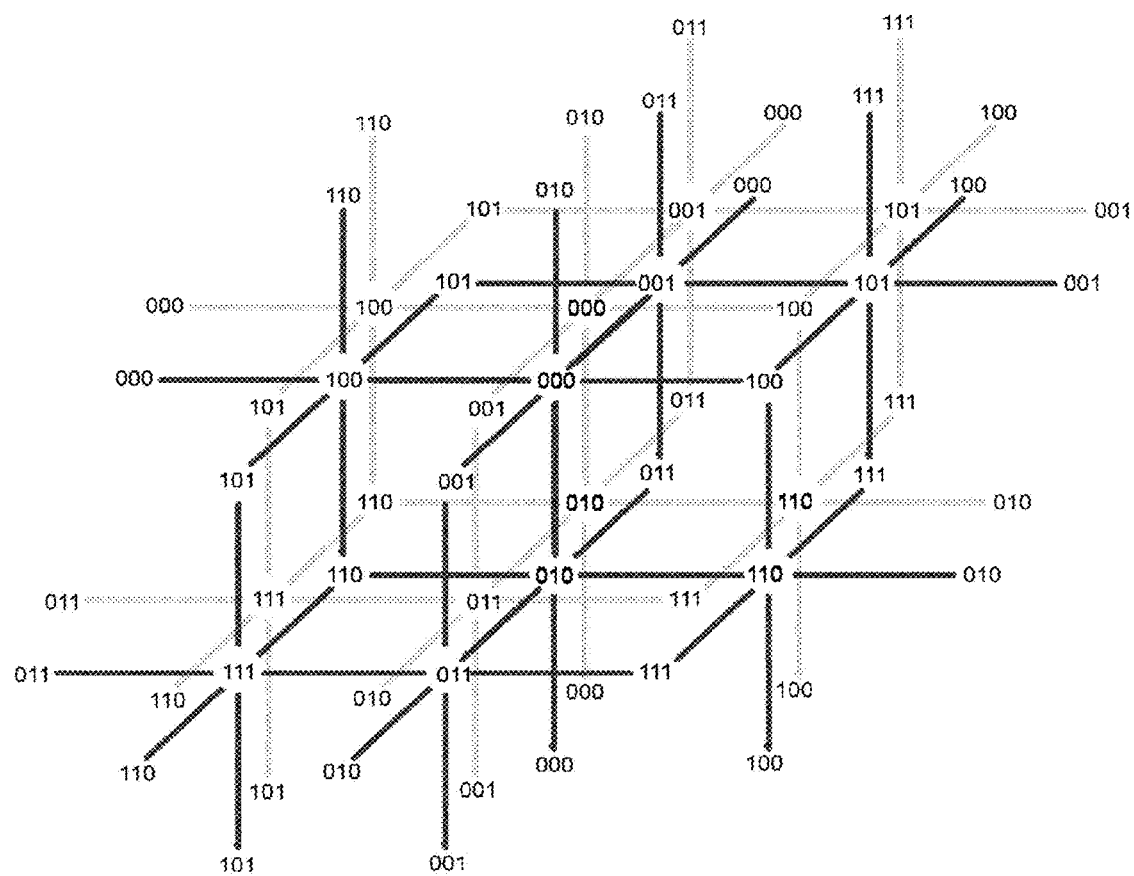
FIG. 13 illustrates inside and outside notes in three dimensions.

FIG. 13 illustrates inside and outside notes in three dimensions (3D). Orientations in 3D of inside nodes and outside nodes form an extended memory complex. Each node connects with three types of nodes. For example, node 101 connects with two nodes of each type 100, 001 and 111, where one node of each type is within the same memory unit, and the other is from the adjacent memory unit. For example, the node 101 connects with node 100 in the positive z-axis within the memory unit, and with the node 100 in the negative z-axis with the adjacent memory unit. This way a network is formed between all memory units.

Figure 14:
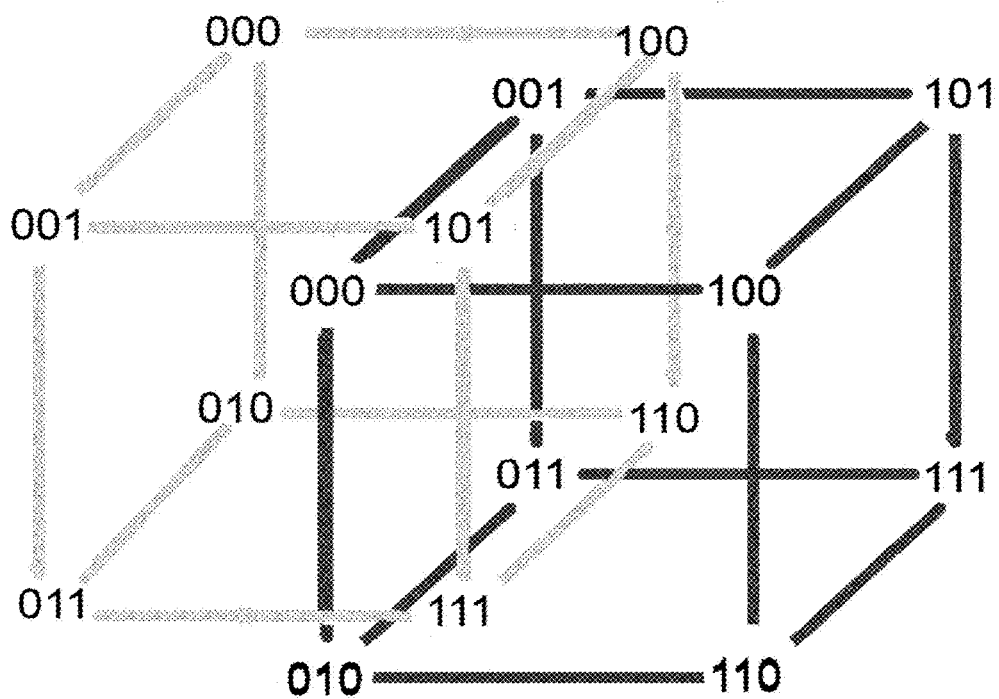
FIG. 14 shows inside nodes surrounded by outside nodes.

FIG. 14 shows inside nodes surrounded by outside nodes. There is no direct connection between inside nodes and outside nodes, but each inside node shares one dedicated cell with one outside node. For example, the 101 inside node would be surrounded by outside nodes through processing cell units: dedicated cell 12 also connects with outside node of 000 type, dedicated cell 13 also connects with outside node of 100 type, dedicated cell 14 also connects with outside node of 010 type, dedicated cell 15 also connects with outside node of 110 type, dedicated cell 28 also connects with outside node of 001 type, dedicated cell 29 also connects with outside node of 101 type, dedicated cell 30 also connects with outside node of 011 type, and dedicated cell 31 also connects with outside node of 111 type. This way for any combination of active processing cell units in 101 inside node, is surrounded by outside nodes, which can vary with even with the same 101 inside node activation pattern. This arrangement provides for multi-meaning of the same activation pattern.

Figure 15:
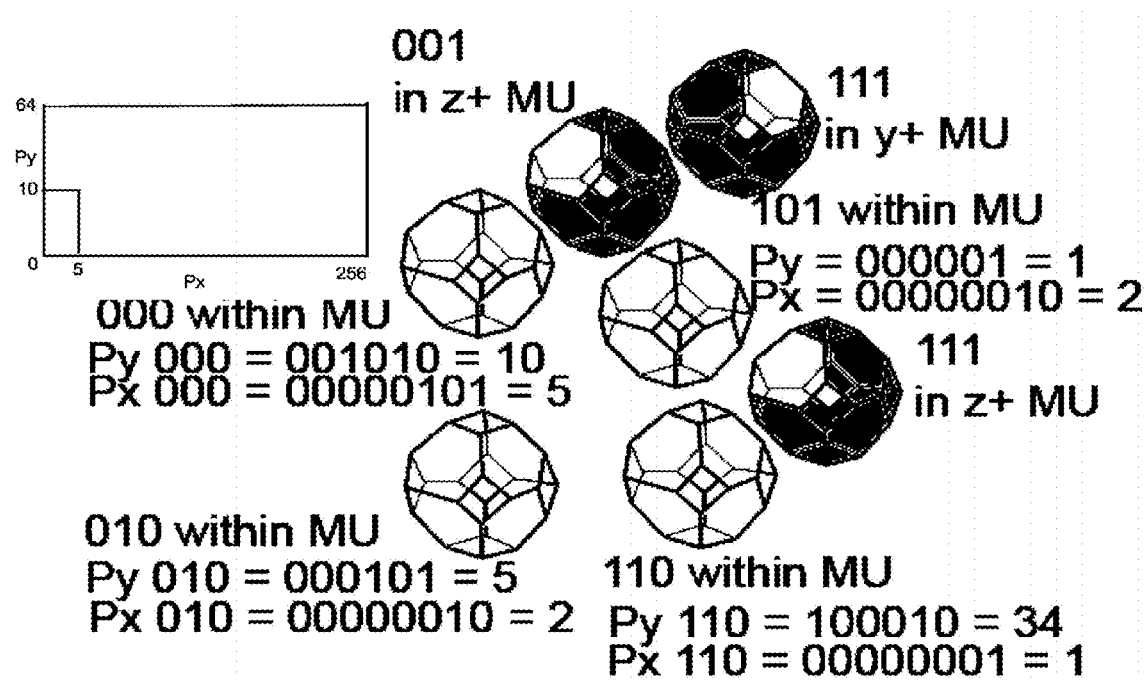
FIG. 15 illustrates an example of networks created for inside nodes central patch memory unit.

FIG. 15 illustrates networks created for inside nodes central patch memory unit. The four white octagons are nodes within the central patch memory unit, and the darkened octagons are in memory units of surrounding patches. Each central patch memory unit node has its Px and Py. Each node has a memory array of 256 by 64 with Px on x-axis, and Py on y-axis.

Figure 16:
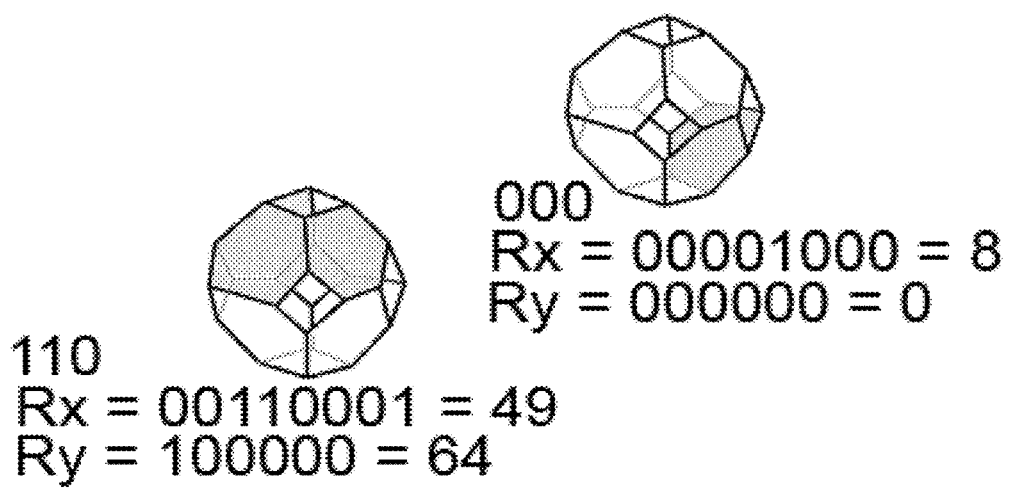
FIG. 16 illustrates an example of networks created for outside nodes central patch memory unit.

FIG. 16 illustrates networks created for outside nodes central patch memory unit. The surrounding memory units are not active for outside nodes. Only the patch memory unit has two octagons activated.

Figure 17:
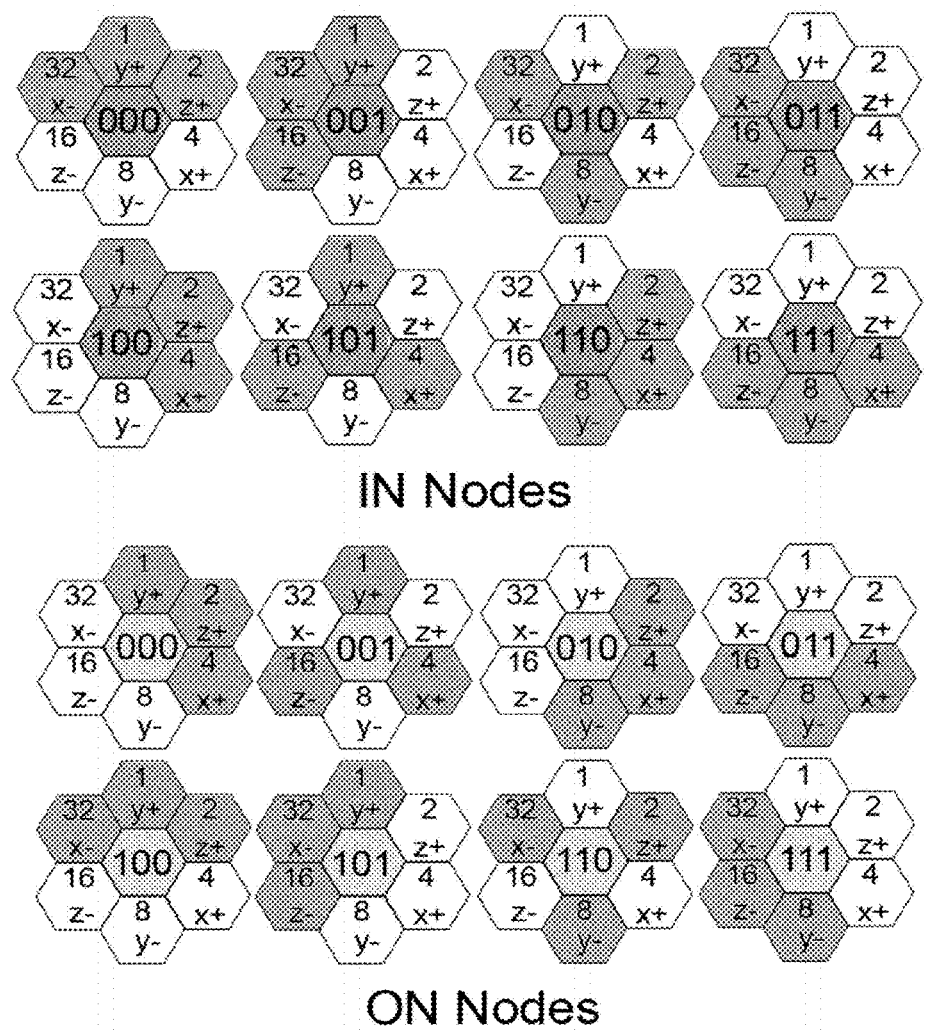
FIG. 17 illustrates node representation in a processing cell system with 3D orientation.
Figure 18:
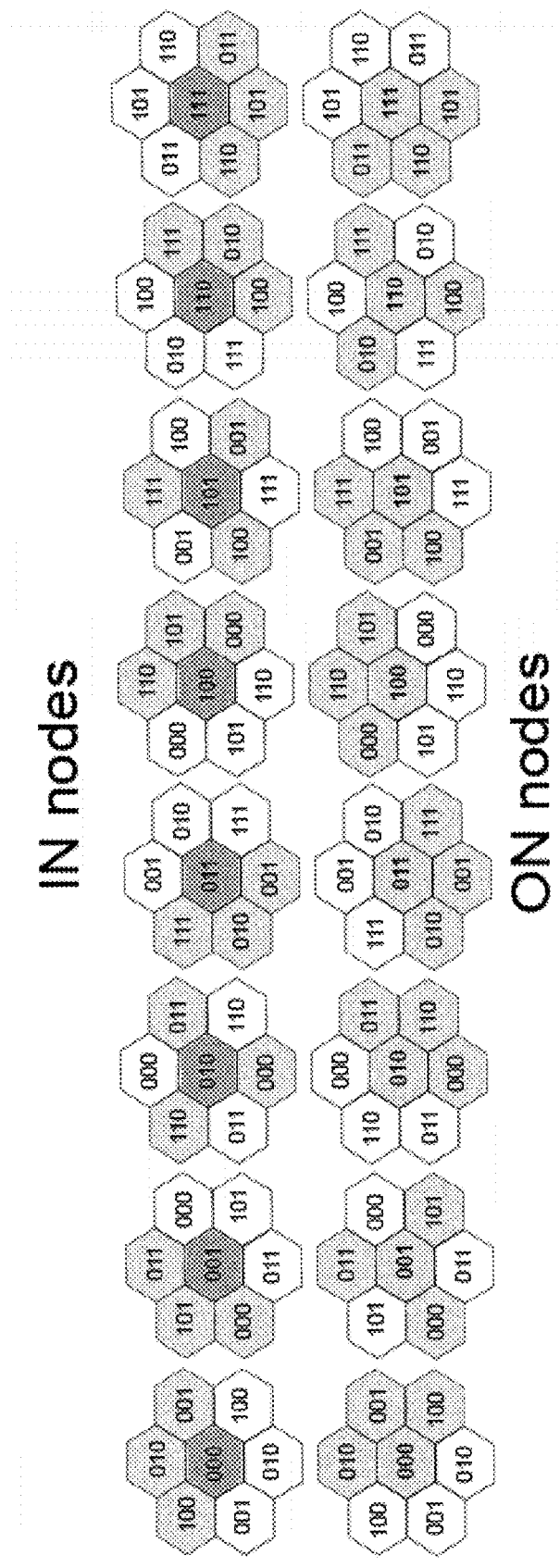
FIG. 18 illustrates how nodes connect with other types of nodes within a single memory unit (no shading) and with adjacent memory units (with shading).

FIG. 17 illustrates node representation in a processing cell system with 3D orientation. Each node has 3D connections with nodes within the Memory Unit (white spaces), and connections with nodes in adjacent Memory Units (darkened spaces). The numbers correspond to binary number spaces. Each node can be represented as a Processing Cell, therefore all the nodes can be used to create another Input Layer for another Module FIG. 18 illustrates how nodes connect with other types of nodes within a single memory unit (no shading) and with adjacent memory units (with shading).

Regarding treatment of information in the feedback process, nodes reinforce the memory position of Py/Px if new input creates the same Px or Py. Nodes could also be triggered through node input/output layer from another module, which would then send the "query" to processing cell units. If there was no answer to the query, the associated Py/Px memory position would be weakened. Processing cell units would in turn search its long term memory for corresponding Rx/Px and pull out all associated active patch numbers (i.e., the decimal numbers) and set them in short-term memory. If there were no associated active patch numbers Rx/Px, a dedicated cell would search for active patch numbers associated only with Rx or Px, and set them in short-term memory. Short term memory would send one active patch number at a time to processing cells of the hidden layer. Activated processing cells in the patch would search for the given processing cell units and its dedicated cells, i.e., positions in which those decimal numbers were found. If there was conflict in the patch (two different processing cell units activated in the same processing cell), the central processing cells would systematically vary the dedicated cells of processing cell units until a non-conflicting solution is found, and send it back a positive feedback to processing cell units. If no memory of some processing cell units exists, the processing cell would return 0 to central processing cell, which would recalculate the active patch number and send it back to processing cell units.

An active patch number recognized by processing cell units would activate associated inside node/outside node connections as the answer for the query. An answered query reinforces the Py/Px memory position (which has a limited range for reinforcement). A non-answered query would weaken the Py/Px memory position.

An example of the information flow is as follows: Px 5 sent to dedicated cell 35 from inside node 001-Rx 49 sent to dedicated cell 35 from outside noted 110. Inside node 001 has Py/Px=10/5 activated from the inputs or a querying module. That would mean that only its dedicated numbers 32 and 35 were active. As one of its dedicated cell numbers is 35, it sends Px=5 to all of its dedicated cells (32, 33, 34, 35, 48, 49, 50, 51) as a query, i.e. "Do you have anything recorded for Px=5?". Px changes as there is no answer from dedicated cell 35. Inside node 001 can have a threshold on how many processing cell units have to answer in order for it to memorize the new Px, or send it forward to another querying module. Assume that dedicated cells 32 and 48 find Px=5 in its memory, and find it associated active patch number 31. The dedicated cell 32 also finds that the active patch number 31 is associated with dedicated cell number 4, and the dedicated cell 48 finds that active patch number 31 is associated with dedicated patch number 15. Then, active patch number 31 and dedicated cell number 4 are sent to the patch. Then, active patch number 31 and dedicated cell number 15 are sent to the patch. Dedicated cell 35 then checks if there was a recorded match for Px/Rx=(5, 49). When no direct match is found for Px=5, dedicated cell 35 looks if (x, 49) exist. If (12, 49) is found, where Px=12 is associated with active patch number 31, which is in turn associated with dedicated cell number 5, then Active Patch Number/Dedicated Cell Number=APN/DCN=(31, 5) is stored in short-term memory. Then, dedicated cell 35 sends active patch number 31=0011111 to associated patch with dedicated cell number 54. Then, after receiving "clash," dedicated cell 35 sends the next dedicated cell number to the patch, if another dedicated cell number was associated with the active patch number 31. (The processing cell can "solve" the clash in binary position 4 (dedicated numbers competing for the place in this example would be 48, 32 and 35), and binary positions 1 and 8 (competing numbers 48 and 35). As decimal number 35 (100011) includes 32 (100000), clash is solved in favor of 35, and as 48 (110000) and 35 are can be added the resulting number would be 51 (110011).) If there is no clash, and the patch has the active patch number 00/00/00/51/51/48/51=0001111=15, then dedicated cells 32 and 48 can respond to the query. Dedicated cell 35 memorizes active patch number 15 and dedicated cell number 12, but does not answer the query. Otherwise, the central hexagram processing unit returns "clash" to dedicated cell 32, 35 and 48.

A hidden layer in a module can analyze network information provided by inside nodes and outside nodes in complex ways, using the type of interaction described previously. The simple programs at each level can be substituted by better programs, depending on what a result is supposed to be. There is no limit to types of modules or programs that can be adjusted that way, therefore the hidden layer permits construction of a complex feedback system.

Using various hidden layers in a module can give the output to several other modules in input layers. Each one of other modules can be specialized with simple programs to modify the flow of information. Thus, the hardware can be used as a basis in building of complex systems with feedback networks that can create emergent behaviors similar to swarm intelligence and can therefore contribute to further development of artificial intelligence. Thus, an optional step in the method is providing a plurality of hidden layers to receive output from adjusted threshold parameters in the input layer.

As a further example and elaboration of potential embodiments of the invention, the algorithms for all hexagrams may have similar structure, but can be slightly different depending where they are found.

For hexagram input receiving cells, an exemplary algorithm is:

Input Mode
Assuming the input is light, photosensitive cell sends voltage to the program, or if it is sound or data it would send an impulse according to the sensitivity of its receptor.
It would switch to the analysis mode.

Analysis Mode
Program checks the strength of the input against the threshold (x %).
If the strength is at or above the threshold, program outputs 1 to central hexagram cell's corresponding binary place.
If the strength were below the threshold the program would switch to receiving mode.

Receiving Mode
Program becomes receptive to the feedback from the central hexagram cell.
It determines if the feedback is a threshold variable (x %), positive feedback, or a "highlight" feedback.
It switches to adjust mode or recognition mode accordingly.
If there is no feedback it switches to input mode.

Adjust Mode
If the feedback is a threshold variable, it adjusts its threshold.
It switches back to input mode.

Recognition Mode
If the feedback is a positive feedback it activates its binary position in central hexagram cell.
It switches to monitor mode.

Monitor Mode
If a "highlight" feedback, it highlights associated pixels on the monitor.
If the receiving cell is active, it activates monitor pixels associated with it.
If the cell is not active, it switches to input mode.

For central hexagram cell in the input layer, an exemplary algorithm is:

Input Mode
Receives either 1 or nothing from six surrounding receiving cells.
Combines the binary places into one decimal number (a primitive).
It switches to analysis mode.

Analysis Mode
If the number is zero, it switches to receiving mode.
Else it sends the number to the first central processing unit of the corresponding hexagram in the hidden layer.
Then switches to receiving mode.

Receiving Mode
Program becomes receptive to the feedback from the hidden layer.
It determines if it is the threshold variable (x %) or a query.
It switches to adjust mode or recognition mode accordingly.
If there is no feedback, it switches to input mode.

Adjust Mode
It sends the threshold variable (x %) back to the receiving cells.
Switches back to the input mode.
Recognition Mode
Query number comprises of one primitive and a number representing threshold percent (if primitive is 47 that implies 5 active receptive cells for query. Threshold could be 4 active cells that overlap with the query, i.e. 4/6, therefore x/6).
Query is compared to the input number.
If the two are identical, the positive feedback is sent to the hidden layer hexagram, and to input layer receiving cells.
Program switches to monitor mode.
The primitive is remembered against input and the strength is increased by 1.
If the input is above the query threshold, the positive feedback is sent to the hidden layer hexagram.
The primitive is remembered against input, but the strength stays the same.
If comparison is below threshold, negative feedback is sent to the hidden layer hexagram.
The below threshold primitive, if memorized, has its strength decreased by 1.
If the two have 1s above the threshold percent, the positive feedback is sent to the hidden layer hexagram.
Program switches to monitor mode.
Monitor Mode
Program activates receiving cells associated with positive feedback.
Program sends "highlight" feedback to receiving cells when primitive comparison is above threshold.
It locks into monitor mode for certain number of clock cycles.
Program switches to input mode.
For receiving hexagram in the hidden layer, an exemplary algorithm is:
Input Mode
Program checks if the input is a positive feedback, negative feedback, or input primitive.
If it is a positive or negative feedback it switches to Analysis Mode.
If it is one of the 64 primitives from the input layer, it sends the received primitive to allocated binary place in the Hidden Layer central hexagon.
It switches to Receiving Mode.
Analysis Mode
Non-memorized positive feedback Active Patch Number (APN) vs. primitive is memorized with strength 1.
If the number was already memorized, it increases strength by 1.
With negative feedback it diminishes strength by 1 of the pair of APN vs. primitive even if it has not been memorized before.
If it is a query and active patch number (APN) is found in memory it checks if memorized primitives are equal to sending dedicated cells (DCs) for that APN.
If exact match is found, the positive feedback is sent as a DC (where DC=primitive) to associated binary place in central hexagram of the hidden layer.
If it is a query and no APN is found in the memory, it switches to the Input Mode.
If it is a query and the exact APN is not found, it compares with recorded APNs and stores in short term memory all APNs that are above threshold number (x/7 exact places).
It compares recorded primitives with DCs above threshold (x/6 exact places) for each APN in the register and sends them to the central hexagon of the Hidden Layer as "answer".
If it receives negative feedback, it sends next APN/primitive from the register.
If it received positive feedback, it switches to Adjustment Mode.
Receiving Mode
It checks if the received numbers are input layer (IL) threshold adjustment variable (x %), the APN query with a recognition threshold number (x/7), or positive or negative feedback.
If it is the APN query with a recognition threshold number, it switches to Analysis Mode.
If it receives an IL threshold adjustment variable (x %) it sends it to the corresponding central hexagram of the input layer.
If it receives an active patch number (APN) as a query from the central hexagon, it switches to Analysis Mode.
Adjustment Mode
It switches to recognition mode.
Recognition Mode
It memorizes the positive feedback APN and its binary place primitive or increases its strength number by 1.
It switches to Monitor Mode.
Monitor Mode
It sends positive feedback for the primitive to central hexagram of the input layer.
It sends positive feedback to the Hidden Layer central hexagon, and locks into Monitor Mode for certain number of clock cycles.
Program switches to Input Mode.
For hidden layer central hexagram, the algorithms is:
Input Mode
Checks if the numbers are input primitives, returning APN/primitive answers or positive feedbacks.
If the numbers are input primitives it switches to Analysis Mode.
If the numbers are APN/primitive answers, it switches to Analysis Mode.
If it is positive feedback it goes to Adjustment Mode.
Analysis Mode
If it is input primitives it changes the primitives from 6 receiving cells and its own input primitive, counts 1s and divides them by 7, and sets it as the threshold for the input layer (x %).
It makes a Patch Number (PN) out of the 7 primitives and sends it to DCs.
It makes Active Patch Number (APN) out of PN so that each two digits represent a primitive, and if the two digits are greater than 0, they are converted to 1, otherwise two digit numbers are converted to 0.
It memorizes APN vs. primitives.
It switches to Adjustment Mode.
If it is a returning APN/primitive answer, it queries the DC that equals the primitive if it has memory of associated APN.
If it is positive feedback on APN query, it switches to Adjustment Mode.
It switches to the Receiving Mode.
Dedicated cell numbers (DCNs) are sent to specific binary places with associated APNs and threshold variable (x/7).

If the Dedicated Cell Numbers (DCNs) create a non-conflicting PN, it sends positive feedback to receiving hexagrams, and a positive feedback to querying DCs with the associated APN.

It switches to Adjustment Mode.

If DCNs conflict in specific binary places (several DCs to same binary place), it sends a query to that receiving cell.

It switches to the Input Mode.

Receiving Mode

Checks if it is a DC query (APN, DCN and x/7), positive feedback on APN query, or negative feedback on APN query.

If it is APN/DCNs it switches to Analysis Mode.

If it is positive feedback it switches to Monitor Mode.

If it is negative feedback it switches to Input Mode.

Adjustment Mode

If it is an input threshold number (x %), it is sent to receiving cells of HL and to input layer's central hexagram directly under the c cell.

If it is a positive feedback above the recognition threshold, it fixes the DC/primitives in corresponding binary places of PN.

It switches to Receiving Mode.

Recognition Mode

It memorizes APN/DCN pair after positive feedback.

It forwards PN as primitives to the Memory Unit's DCs.

It switches to Receiving Mode.

Monitor Mode

It locks primitive in DCN places and sends positive feedback to corresponding receiving cells.

It sends positive feedback to DCs.

It switches to Input Mode.

For dedicated cells of a memory unit, an exemplary algorithm is:

Input Mode

Checks if the number is PN, positive feedback with APN or an APN query.

If it is positive feedback it switches to Adjustment Mode.

If it is PN it switches to Analysis Mode.

Analysis Mode

Patch Number (PN) is checked for positions of its own DC primitive.

If it does not contain its own primitive, PN is ignored, and it switches to Input mode.

If it does contain its own primitive, Patch Number (PN) is converted to a binary number where each two digits represent a primitive, and if the two digits are greater than 0, they are converted to 1, and the other two digit numbers are converted to 0.

Those numbers are gathered into the Active Patch Number (APN).

PN is also checked for presence of its own primitive. All positions where that DC primitive is present are converted to 1 (the rest of positions are 0), creating a Dedicated Cell Number (DCN).

It activates the IN and ON nodes sending them DCN.

APN/DCN pair is memorized.

It switches to Receiving Mode.

It searches memory for same Px/Rx pairs.

If it finds the exact pair of Px/Rx, it sends a positive feedback to IN and ON, and sends the associated APN/DCN pair to central hexagram of the HL patch.

If no exact pairs are found, it searches for same Px or Rx.

If it finds the same Px, it locates the associated APN/Px pair and sends APN/DCN to central hexagram of the HL patch.

If it finds the same Rx in the Px/Rx memory, it locates the associated APN/Px pair and sends APN/DCN to central hexagram of the HL patch.

If no match is found it sends negative feedback to IN and ON.

If it finds several APNs associated with the same Px, it sends APNs to short-term memory and sends one APN/DCN pair at a time to patch central hexagram as a query.

If no APN match is found, it sends negative feedback to IN and ON.

It switches to Input Mode

Receiving Mode

It checks if the numbers are Px/Rx, positive feedback, or negative feedback.

If it is Px/Rx it switches to Analysis Mode

If it is a positive feedback, it memorizes APN/Px pair.

If it is a negative feedback, it decreases APN/DCN pair memory by 1.

It switches to Analysis Mode.

Adjustment Mode

It stores Px/Rx pairs in non-volatile memory and adds 1 to strength variable.

It sends positive feedback to IN and ON.

It switches to Receiving Mode.

For inside nodes or outside nodes, an exemplary algorithm is:

Input Mode

It checks if the input is from DCNs, positive feedback, negative feedback, or a handshake query.

If it is DCNs, it adds them up to a number S, and switches to Analysis Mode.

If it is positive feedback or negative feedback it switches to Adjust Mode.

If it is a handshake query it answers it with a positive feedback and forms Py or Ry, else it sends a negative feedback.

Analysis Mode

If it is a NIOL input, it reads Px/Py and searches for match in memory.

If the exact match is found, it adds 1 to strength number and switches to Output Mode.

If the exact match is not found it searches for overlapping binary matches with 1 binary place difference.

It stores found Px/Py matches in registers and switches to Output Mode.

If Py/Px is not found, it checks for other Pxs associated with that Py.

Sets found Pxs to registers.

It sends Px to DCs as a query, one at a time.

It switches to Input Mode.

If it is DCNs, it checks if the number S is equal or greater to the threshold variable (x/8).

If S is smaller than the threshold variable, it deactivates the IN or ON.

If S is equal or greater than the threshold variable, it keeps IN or ON active.

It forms a Px or Rx from active DCs.

It sends handshake query to surrounding INs or ONs that did not already send the query themselves, and forms Py or Ry.

It memorizes corresponding Px/Py or Rx/Ry.

It returns Px or Rx to active DCs as a query.

It switches to Receiving Mode.

Receiving Mode

If it is input from node input/output layers (NIOL) patch, it forms Px/Py or Ry and moves to Analysis Mode.

It waits for positive or negative handshake answer.

It switches to Analysis Mode.
Adjustment Mode
If DC query returns negative feedback, it decreases strength of Px/Py by 1.
If DC query returns positive feedback, it increases Px/Py strength by 1 and memorizes DC/Px with strength 1, or if already in memory it increases the strength by 1.
It switches to Output Mode.
Output Mode
If it is a NIOL input, it activates DCs from Px.
It sends Px query to activated DCs.
If it is approximate memory output, it sends Px from register as a query, one at a time, to all DCs associated with that IN or ON.
It sends Px and Py or Ry to NIOL central hexagrams.
It switches to Input Mode.

DEFINITIONS

Memory unit or memory unit structure: a set of processing cell units that when assembled together form eight interconnected truncated octahedrons with a storage capacity sufficient to hold 64 primitives.

Patch: a set of seven processing cell units used as an input block to a memory unit.

Processing cell unit: a set of seven hexagram cells comprising of one central hexagram cell (140) and six hexagram receiving cells (120), where hexagram receiving cells (120) are interconnected to the central hexagram cell (140).

Dedicated cell: a hexagram cell dedicated to data storage of one of 64 primitives (processing cell patterns).

Dedicated cells pattern (activated dedicated cell): a binary number identifying positions in a patch where a primitive is found.

Inside node: an octahedron structure interconnected to 8 dedicated cells and six other inside nodes as well as to node input/output layer.

Outside node: an octahedron structure interconnected to 8 dedicated cells and six other outside nodes as well as to node input/output layer.

Sensory unit: a hexagram receiving cell surrounding central hexagram cell.

Memory complex: set of memory units interconnected in a three-dimensional array.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the computer industry.

What is claimed is:

1. A method of pattern recognition, the method comprising the steps of:
   providing a cellular computer structure comprising a plurality of processing cell units arranged in layers:
   each processing cell unit comprising:
   a central hexagram cell and six hexagram receiving cells, the central hexagram cell and each hexagram receiving cell having six faces;
   the central hexagram cell comprising:
   a first central processing unit connected to:
   the six hexagram receiving cells; and
   an input/output port; and
   non-transitory memory for storage of software and data;
   each of the six hexagram receiving cells comprising:
   a second central processing unit;
   a connection to the central hexagram cell;
   non-transitory memory for storage of software and data;
   connected to the central hexagram cell along one face of the central hexagram cell; and
   each processing cell unit capable of localized calculations;
   each processing cell unit interconnected with at least one other processing cell unit;
   the layers comprising: an input layer and a hidden layer;
   each hexagram receiving cell in the input layer further comprising a sensor capable of sensing a threshold parameter in an unknown pattern;
   sensing the threshold parameter in the unknown pattern accessible to each said sensor;
   creating a binary number for each sensed threshold parameter;
   storing each binary number created in each said hexagram receiving cell in the input layer;
   creating a binary sequence by assembling the binary numbers calculated in each hexagram receiving cell in each processing cell unit;
   calculating a decimal number from each binary sequence;
   storing each decimal number in the central hexagram cell of the processing cell unit from which the binary sequence is created;
   outputting the binary sequence to an adjoining processing cell unit in the hidden layer;
   preserving position information of each binary sequence outputted to said adjoining processing cell unit in the hidden layer;
   enabling the hidden layer to adjust the threshold parameter in the input layer to increase or decrease the number of processing cell units in the input layer that are activated for the unknown pattern; and
   analyzing the binary numbers in the hidden layer to compare with known patterns to establish a recognized pattern.

2. The method of claim 1, further comprising the step of limiting the unknown pattern to one capable of being represented in two dimensions within the input layer.

3. The method of claim 1, further comprising the step of limiting the unknown pattern to one selected from the group consisting of: an image, a sound, and a data structure.

4. The method of claim 1, further comprising the step of providing a plurality of hidden layers to receive output from adjusted threshold parameters in the input layer.

5. The method of claim 1, further comprising the steps of:
   storing primitives in the first central processing unit; and
   sending the primitives to the hidden layer.

6. The method of claim 1, further comprising the step of providing a memory unit comprising eight interconnected hexagram cells forming an octahedron, each memory unit comprising eight octahedrons providing non-transitory storage capacity sufficient to hold 64 primitives.

7. The method of claim 6, further comprising the step of creating a network of octahedrons in a honeycomb structure, said honeycomb structure unifying the input layer and said octahedrons serving as nodes for input from, or output to, adjoining modules.

* * * * *